US010191285B2

(12) United States Patent
Wilson et al.

(10) Patent No.: US 10,191,285 B2
(45) Date of Patent: Jan. 29, 2019

(54) HEAD MOUNTED DISPLAY AND GAZE DETECTION SYSTEM (71) Applicant: FOVE, INC., San Mateo, CA (US)

(72) Inventors: Lochlainn Wilson, Tokyo (JP); Keiichi Seko, Tokyo (JP)

(73) Assignee: FOVE, INC., San Mateo, CA (US)

( * ) Notice: Subject to any disclaimer, the term of this patent is extended or adjusted under 35 U.S.C. 154(b) by 0 days.

(21) Appl. No.: 15/622,671

(22) Filed: Jun. 14, 2017

(65) Prior Publication Data
US 2018/0003980 A1 Jan. 4, 2018

(30) Foreign Application Priority Data

Jun. 14, 2016 (JP) .................................. 2016-118078

(51) Int. Cl.
G02B 27/01 (2006.01)
G02B 5/20 (2006.01)
G02B 5/26 (2006.01)
G02B 27/00 (2006.01)

(52) U.S. Cl.
CPC ......... *G02B 27/0172* (2013.01); *G02B 5/208* (2013.01); *G02B 5/26* (2013.01); *G02B 27/0093* (2013.01); *G02B 2027/0127* (2013.01); *G02B 2027/0161* (2013.01); *G02B 2027/0194* (2013.01)

(58) Field of Classification Search
CPC .... G02B 2027/0127; G02B 2027/0161; G02B 2027/0194
See application file for complete search history.

(56) References Cited

U.S. PATENT DOCUMENTS 6,177,952 B1 * 1/2001 Tabata ................. G02B 27/017 348/47
2004/0223122 A1 * 11/2004 Inoguchi .............. G02B 27/017 353/38
2017/0357333 A1 * 12/2017 Balan ................... H04N 13/204

FOREIGN PATENT DOCUMENTS

JP H11-073274 A 3/1999

* cited by examiner

*Primary Examiner* — Chun-Nan Lin
(74) *Attorney, Agent, or Firm* — Venable LLP; Michael A. Sartori; Laura G. Remus

(57) ABSTRACT

A head mounted display that is mounted on the head of a user and used includes an irradiation unit that irradiates the eyes of the user with invisible light, a monitor that displays an image for the user to view wearing a glass for display that transmits visible light and reflects invisible light, an imaging device capable of capturing an image formed by the invisible light, and an output unit that outputs an image captured by the imaging device as an image for gaze detection, and the imaging device images the eyes of the user using the invisible light radiated from the irradiation unit, reflected by the eyes of the user, and reflected by the glass for display.

14 Claims, 8 Drawing Sheets

HEAD MOUNTED DISPLAY AND GAZE DETECTION SYSTEM

BACKGROUND OF THE INVENTION

Field of the Invention

The present invention relates to a head mounted display.

Description of Related Art

Conventionally, a variety of videos are displayed on a head mounted display and can be viewed by a user. For example, a parallax image is displayed and a stereoscopic image can be viewed. In such a head mounted display, gaze of a user is detected to specify which portion of the displayed image is being viewed, or an input using the gaze is performed on the basis of the specified portion.

In Japanese Unexamined Patent Application Publication No. 11-73274, eyes of a user are irradiated with infrared light, the eyes irradiated with the infrared light are imaged, and a direction of gaze of the user is detected on the basis of the infrared light and a position of a pupil of the user in a captured image.

SUMMARY OF THE INVENTION

Incidentally, since the head mounted display is mounted on the head of the user and used, it is preferable that the head mounted display be as light and small as possible. Therefore, in Japanese Unexamined Patent Application Publication No. 11-73274, a camera for imaging the eyes of the user is arranged on the user side with an imaging direction directed to a monitor side in order to realize detection of gaze of the user. A hot mirror that reflects invisible light and transmits visible light is arranged between the eyes of the user and the monitor, and an image reflected by the hot mirror is captured to realize the detection of gaze of the user.

Incidentally, when the hot mirror is arranged, the head mounted display correspondingly increases in a weight, and a space for arranging the hot mirror in the head mounted display is required. Accordingly, there is a problem in that a size of a housing of the head mounted display increases.

Accordingly, the present invention has been made in view of the above problems, and an object thereof is to provide a head mounted display that is smaller and lighter than that in related art, and a gaze detection system using the head mounted display.

In order to solve the above problems, an aspect of the present invention is a head mounted display that is mounted on the head of a user and used, the head mounted display including: an irradiation unit that irradiates the eyes of the user with invisible light; a display that causes a light emitting element that emits light including the invisible light to emit the light and displays an image for the user to view; an imaging device capable of capturing an image formed by the invisible light; and an output unit that outputs an image captured by the imaging device as an image for gaze detection, wherein the display includes a coated surface formed on a surface thereof that transmits the visible light and reflects the invisible light, the coated surface prevents the invisible light emitted from the display from reaching the imaging device, and the imaging device images the eyes of the user using the invisible light radiated from the irradiation unit, reflected by the eyes of the user, and reflected by the coated surface.

Further, the coated surface may be formed by depositing a metal film or a dielectric film on a transparent plate covering the display surface so that visible light is transmitted and invisible light is reflected.

Further, the coated surface may be an invisible light reflective film that transmits visible light and reflects invisible light, the invisible light reflective film adhering to the display surface.

Further, the imaging device may be an imaging device that performs imaging in a global shutter scheme, and the irradiation unit may irradiate the eyes of the user with the invisible light when a global shutter is open and may not irradiate the eyes of the user with the invisible light when the global shutter is closed.

Further, the imaging device may perform imaging in a blanking period in which scanning for displaying the image on the display is performed.

Further, the invisible light may be near-infrared light, the head mounted display may further include a generation unit that generates an image obtained by filtering red at a position corresponding to a red pixel in the image displayed on the display from the image captured by the imaging device, and the output unit may output the image generated by the generation unit.

Further, the display may be arranged obliquely toward the imaging device so that an angle between a plane formed by the display and an imaging optical axis of the imaging device is close to 90°.

Further, a gaze detection system including a head mounted display that is mounted on the head of a user and used, and a gaze detection device that detects a gaze of the user, wherein the head mounted display includes an irradiation unit that irradiates the eyes of the user with invisible light; a display that causes a light emitting element that emits light including the invisible light to emit the light and displays an image for the user to view; an imaging device capable of capturing an image formed by invisible light; and an output unit that outputs an image captured by the imaging device as an image for gaze detection, the gaze detection device includes a gaze detection unit that detects a gaze direction of the user on the basis of the image output by the output unit, the display includes a coated surface formed on a surface thereof that transmits the visible light and reflects the invisible light, the coated surface prevents the invisible light emitted from the display from reaching the imaging device, and the imaging device images the eyes of the user using the invisible light radiated from the irradiation unit, reflected by the eyes of the user, and reflected by the coated surface.

Further, the invisible light is near-infrared light, and the gaze detection unit executes gaze detection on the basis of an image that is generated by performing filtering for suppressing chroma of red at a position corresponding to a red-based pixel in the image displayed on the display, on the image output from the output unit.

Conversion of an arbitrary combination of the above components and the expression of the present invention between a method, a device, a system, a computer program, a data structure, a recording medium, and the like is also effective as an aspect of the present invention.

According to the present invention, it is possible to provide a technology for detecting a gaze direction of a user wearing a head mounted display.

DETAILED DESCRIPTION OF THE INVENTION

DETAILED DESCRIPTION OF THE INVENTION

Figure 1:
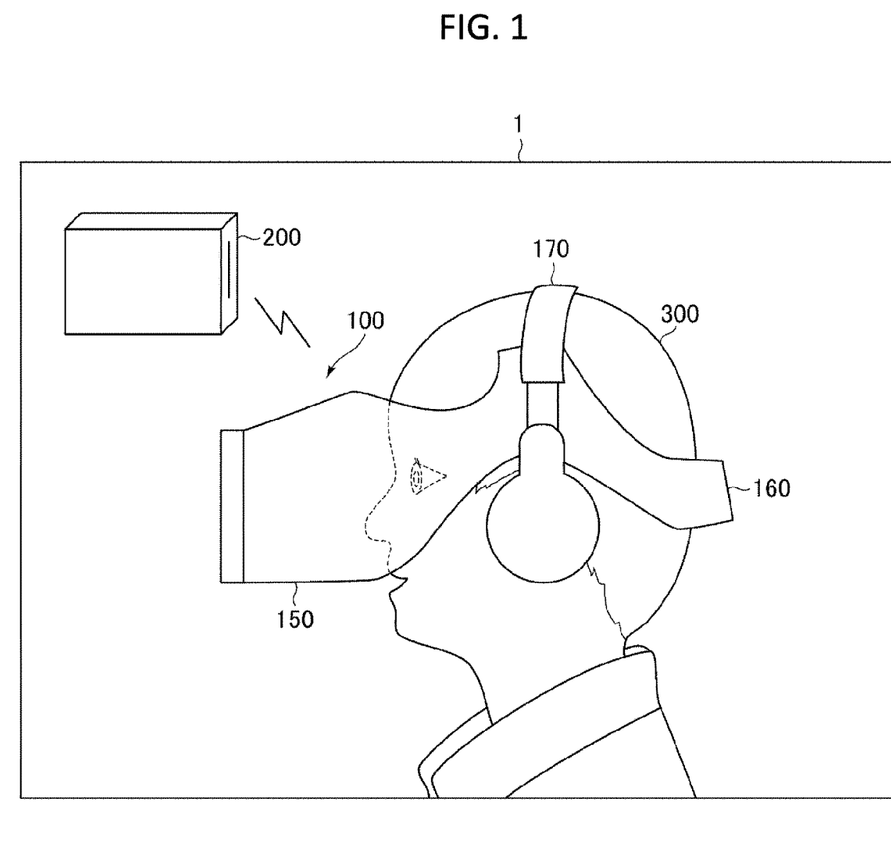
FIG. 1 is an external view illustrating a state in which a user wears a head mounted display according to an embodiment.

FIG. 1 is a diagram schematically illustrating an overview of a gaze detection system 1 according to an embodiment. The gaze detection system 1 according to the embodiment includes ahead mounted display 100 and a gaze detection device 200. As illustrated in FIG. 1, the head mounted display 100 is mounted on the head of the user 300 for use.

The gaze detection device 200 detects a gaze direction of right and left eyes of the user wearing the head mounted display 100, and specifies a focal point of the user, that is, a gaze point of the user in a three-dimensional image displayed on the head mounted display. Further, the gaze detection device 200 also functions as a video generation device that generates videos displayed by the head mounted display 100. For example, the gaze detection device 200 is a device capable of reproducing videos of stationary game machines, portable game machines, PCs, tablets, smartphones, phablets, video players, TVs, or the like, but the present invention is not limited thereto. The gaze detection device 200 is wirelessly or wiredly connected to the head mounted display 100. In the example illustrated in FIG. 1, the gaze detection device 200 is wirelessly connected to the head mounted display 100. The wireless connection between the gaze detection device 200 and the head mounted display 100 can be realized using a known wireless communication technique such as Wi-Fi (registered trademark) or Bluetooth (registered trademark). For example, transfer of videos between the head mounted display 100 and the gaze detection device 200 is executed according to a standard such as Miracast (registered trademark), WiGig (registered trademark), or WHDI (registered trademark).

FIG. 1 illustrates an example in which the head mounted display 100 and the gaze detection device 200 are different devices. However, the gaze detection device 200 may be built into the head mounted display 100.

The head mourned display 100 includes a housing 150, a fitting harness 160, and headphones 170. The housing 150 houses an image display system, such as an image display element, for presenting videos to the user 300, and a wireless transfer module (not illustrated) such as a Wi-Fi module or a Bluetooth (registered trademark) module. The fitting harness 160 is used to mount the head mounted display 100 on the head of the user 300. The fitting harness 160 may be realized by, for example, a belt or an elastic band. When the user 300 wears the head mounted display 100 using the fitting harness 160, the housing 150 is arranged at a position where the eyes of the user 300 are covered. Thus, if the user 300 wears the head mounted display 100, a field of view of the user 300 is covered by the housing 150.

The headphones 170 output audio for the video that is reproduced by the gaze detection device 200. The headphones 170 may not be fixed to the head mounted display 100. Even when the user 300 wears the head mounted display 100 using the fitting harness 160, the user 300 may freely attach or detach the headphones 170.

Figure 2:
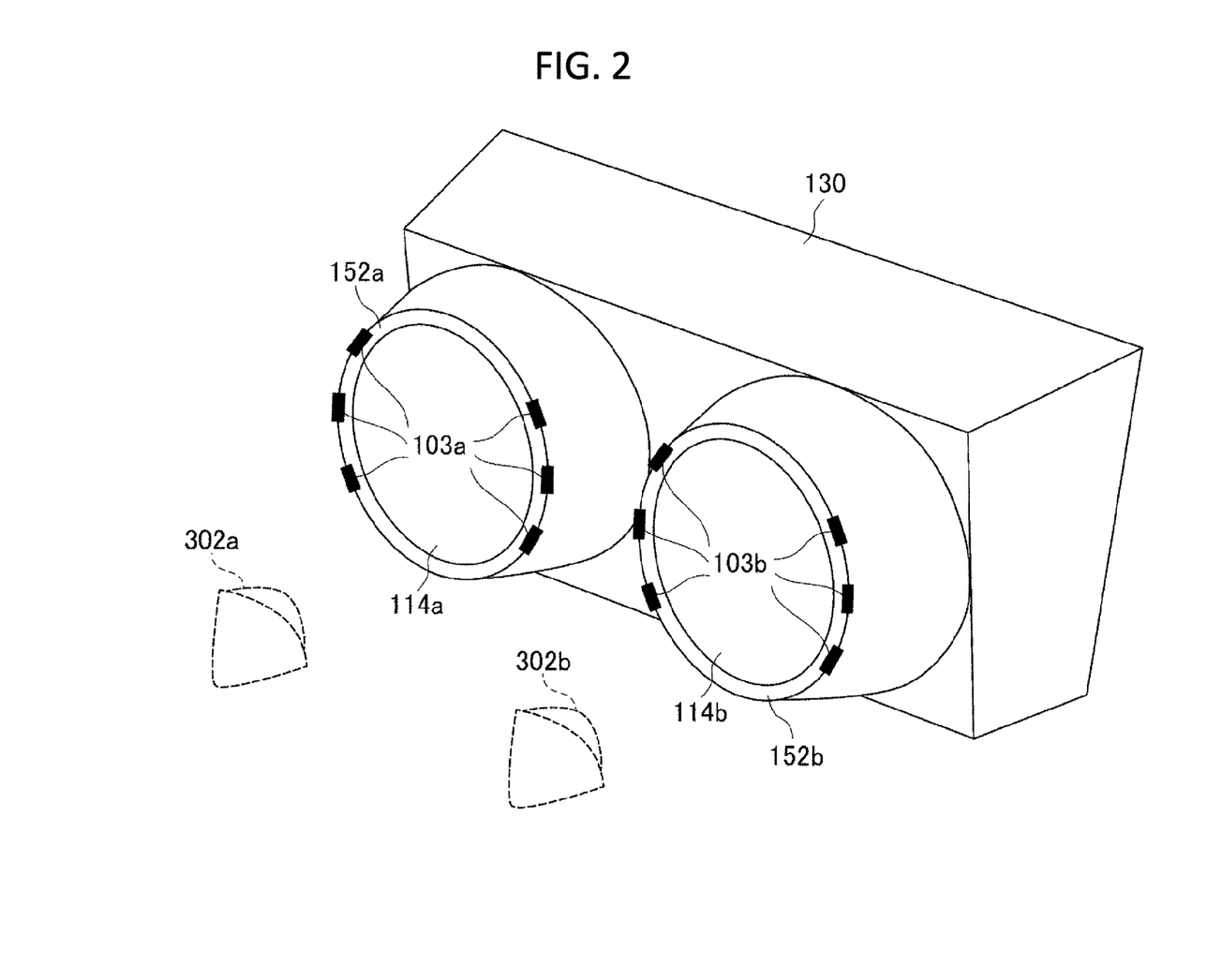
FIG. 2 is a perspective view schematically illustrating an overview of an image display system of the head mounted display according to the embodiment.

FIG. 2 is a perspective diagram illustrating an overview of the image display system 130 of the head mounted display 100 according to the embodiment. Specifically, FIG. 2 illustrates a region of the housing 150 according to an embodiment that faces corneas 302 of the user 300 when the user 300 wears the head mounted display 100.

As illustrated is FIG. 2, a convex lens 114a for the left eye is arranged at a position facing the cornea 302a of the left eye of the user 300 when the user 300 wears the head mounted display 100. Similarly, a convex lens 114b for a right eye is arranged at a position facing the cornea 302b of the right eye of the user 300 when the user 300 wears the head mounted display 100. The convex lens 114a for the left eye and the convex lens 114b for the right eye are gripped by a lens holder 152a for the left eye and a lens holder 152b for the right eye, respectively.

Hereinafter, in this specification, the convex lens 114a for the left eye and the convex lens 114b for the right eye are simply referred to as a "convex lens 114" unless the two lenses are particularly distinguished. Similarly, the cornea 302a of the left eye of the user 300 and the cornea 302b of the right eye of the user 300 are simply referred to as a "cornea 302" unless the corneas are particularly distinguished. The lens holder 152a for the left eye and the lens holder 152b for the right eye are referred to as a "lens holder 152" unless the holders are particularly distinguished.

A plurality of infrared light sources 103 are included in the lens holders 152. For the purpose of brevity, in FIG. 2, the infrared light sources that irradiate the cornea 302a of the left eye of the user 300 with infrared light are collectively referred to as infrared light sources 103a, and the infrared light sources that irradiate the cornea 302b of the right eye of the user 300 with infrared light are collectively referred to as infrared light sources 103b. Hereinafter, the infrared light sources 103a and the infrared light sources 103b are referred to as "infrared light sources 103" unless the infrared light sources 103a and the infrared light sources 103b are particularly distinguished. In the example illustrated in FIG. 2, six infrared light sources 103a are included in the lens holder 152a for the left eye. Similarly, six infrared light sources 103b are included in the lens holder 152b for the right eye. Thus, the infrared light sources 103 are not directly arranged in the convex lenses 114, but are arranged in the lens holders 152 that grip the convex lenses 114, making the attachment of the infrared light sources 103 easier. This is because machining for attaching the infrared light sources 103 is easier than for the convex lenses 114 that are made of glass or the like since the lens holders 152 are typically made of a resin or the like.

As described above, the lens holders 152 are members that grip the convex lenses 114. Therefore, the infrared light sources 103 included in the lens holders 152 are arranged around the convex lenses 114. Although there are six infrared light sources 103 that irradiate each eye with infrared light herein, the number of the infrared light sources 103 is not limited thereto. There may be at least one light source 103 for each eye, and two or more light sources 103 are desirable.

Figure 3:
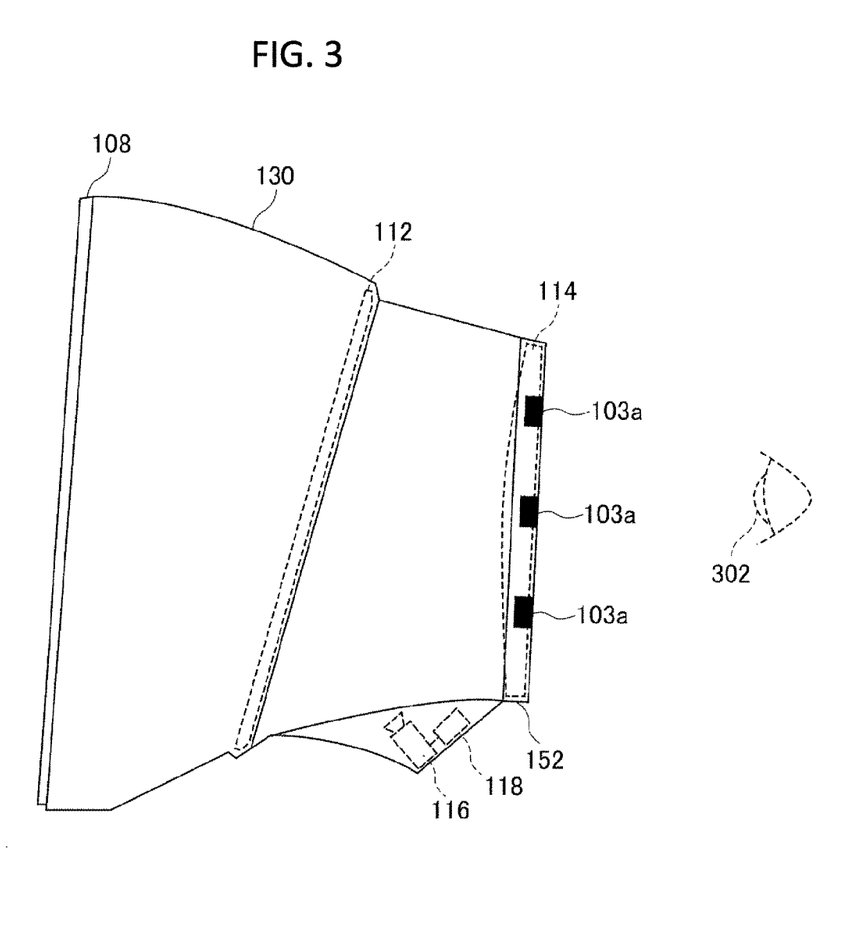
FIG. 3 is a diagram schematically illustrating an optical configuration of an image display system of the head mounted display according to the embodiment.

FIG. 3 is a schematic diagram of an optical configuration of the image display system 130 contained in the housing 150 according to the embodiment, and is a diagram illustrating a case in which the housing 150 illustrated in FIG. 2 is viewed from a side surface on the left eye side. The image display system 130 includes infrared light sources 103, an image display element 108, the convex lenses 114, a camera 116, and a first communication unit 118.

The infrared light sources 103 are light sources capable of emitting light in a near-infrared wavelength region (700 nm to 2500 nm range). Near-infrared light is generally light in a wavelength region of non-visible light that cannot be observed by the naked eye of the user 300. The near-infrared light used herein may be light in a wavelength region that is not harmful to the user.

The image display element 108 displays an image to be presented to the user 300. The image to be displayed by the image display element 108 is generated by a video output unit 222 in the gaze detection device 200. The video output unit 222 will be described below. The image display element 108 can be realized by using a known liquid crystal display (LCD) or organic electro luminescence display (organic EL display). The image display element 108 is covered with glass or a transparent resin coated with the coated surface on the surface side thereof, which is at least on the eye side of the user. The coated surface is a surface formed to transmit visible light and reflect the invisible light and is realized by, for example, the deposited metal film or dielectric film (dielectric multilayer film). The metal film is, for example, aluminum (Al), gold (Au), platinum (Pt), chromium (Cr), titanium (Ti), nickel (Ni), molybdenum (Mo), copper (Cu), silver (Ag), or an alloy film thereof. Further, the dielectric film is, for example, at least one of titanium oxide ($TiO_3$), silicon oxide ($SiO_2$), niobium ($Nb_2O_5$), tantalum ($Ta_2O_5$), and magnesium fluoride ($MgF_2$). That is, a metal film coating or a dielectric film coating is formed on the surface of the image display element 108, and therefore a configuration of transmitting visible light and reflecting invisible light is realized. Thus, the camera 116 can capture an image of the eyes of the user irradiated with the infrared light through reflection in the image display element 108 without disturbing the user viewing an image displayed on the image display element 108.

Incidentally, the image display element 108 includes a plurality of pixels for displaying an image for presentation to the user 300, and each pixel includes a light emitting element (for example, a light emitting diode (LED)) that emits light of each color. The light emitting element basically emits visible light that can be viewed by the user 300, but light components at frequencies in an invisible light region are also emitted from the light emitting element. Thus, in a state in which there is no coated surface on the surface of the image display element 108, the invisible light (near-infrared light) emitted from the light emitting element is likely to be noise for the infrared light radiated from the infrared light source 103 by the camera 116. However, by the image display element 108 according to this embodiment including the coated surface formed on a surface thereof that transmits the visible light and reflects the invisible light, it is possible to reflect the invisible light emitted from the image display element 108. Therefore, the head mounted display 100 includes a configuration for suppressing the invisible light emitted from the image display element 108 in the camera 116. Between glass and resins, resins have a merit in that resins can be used to build the head mounted display 100 with a lighter weight than glass, it is easy to perform a process of forming unevenness on a surface thereof, and it is easy to adjust optical reflection characteristics.

Further, it is preferable for the image display element 108 to be obliquely arranged so that a plane on which the image display element 108 is formed is close to 90° with respect to an imaging optical axis of the camera 116. However, in this case, the image display element 108 is tilted so that the user does not feel uncomfortable in viewing the image drawn on the image display element 108. By tilting the image display element 108, an image obtained from imaging using the camera 116 can be distorted as little as possible.

The convex lens 114 is arranged between the image display element 108 and the cornea 302 of the user 300 when the user 300 wears the head mounted display 100, as illustrated in FIG. 3. That is, the convex lenses 114 are arranged at positions facing the corneas 302 of the user 300 when the user 300 wears the head mounted display 100.

The convex lenses 114 condense image display light from the image display element 108. Thus, the convex lenses 114 function as image magnifiers that enlarge an image created by the image display element 108 and present the image to the user 300. Although only one of each convex lens 114 is illustrated in FIG. 2 for convenience of description, the convex lenses 114 may be lens groups configured by combining various lenses or may be a plano-convex lens in which one surface has curvature and the other surface is flat.

A plurality of infrared light sources 103 are arranged around the convex lens 114. The infrared light sources 103 emit infrared light toward the cornea 302 of the user 300.

Although not illustrated in the figure, the image display system 130 of the head mounted display 100 according to the embodiment includes two image display elements 108, and can independently generate an image to be presented to the right eye of the user 300 and an image to be presented to the left eye of the user. Accordingly, the head mounted display 100 according to the embodiment may present a parallax image for the right eye and a parallax image for the left eye to the right and left eyes of the user 300. Thereby, the head mounted display 100 according to the embodiment can present a stereoscopic video that has a feeling of depth for the user 300.

As described above, in the image display element 108, glass or a transparent resin covering the surface thereof transmits visible light but reflects near-infrared light. Thus, the image light emitted by the image display element 108 is transmitted through the glass or the transparent resin, and reaches the cornea 302 of the user 300. The infrared light emitted from the infrared light sources 103 reaches the cornea 302 of the user 300.

The infrared light reaching the cornea 302 of the user 300 is reflected by the cornea 302 of the user 300 and is directed to the convex lens 114 again. This infrared light is transmitted through the convex lens 114 and is reflected by the surface of the image display element 108. The camera 116 includes a filter that blocks visible light and images the near-infrared light reflected by the surface of the image display element 108. That is, the camera 116 is a near-infrared camera which images the near-infrared light emitted from the infrared light sources 103 and reflected by the cornea of the eye of the user 300, as indicated by a dash-dotted line in FIG. 3.

Although not illustrated in the figure, the image display system 130 of the head mounted display 100 according to the embodiment includes two cameras 116, that is, an imaging unit that captures an image including the infrared light reflected by the right eye and an imaging unit that captures an image including the infrared light reflected by the left eye. Thereby, images for detecting gaze directions of both the right eye and the left eye of the user 300 can be acquired.

The first communication unit 118 outputs the image captured by the camera 116 to the gaze detection device 200 that detects the gaze direction of the user 300. Specifically, the first communication unit 118 transmits the image captured by the camera 116 to the gaze detection device 200. Although the gaze detection unit 221 functioning as a gaze direction detection unit will be described below in detail, the gaze direction unit is realized by a gaze detection program executed by a central processing unit (CPU) of the gaze detection device 200. When the head mounted display 100 includes computational resources such as a CPU or a memory, the CPU of the head mounted display 100 may execute the program that realizes the gaze direction detection unit.

As will be described below in detail, bright spots caused by near-infrared light reflected by the cornea 302 of the user 300 and an image of the eyes including the cornea 302 of the user 300 observed in a near-infrared wavelength region are captured in the image captured by the camera 116.

Figure 4:
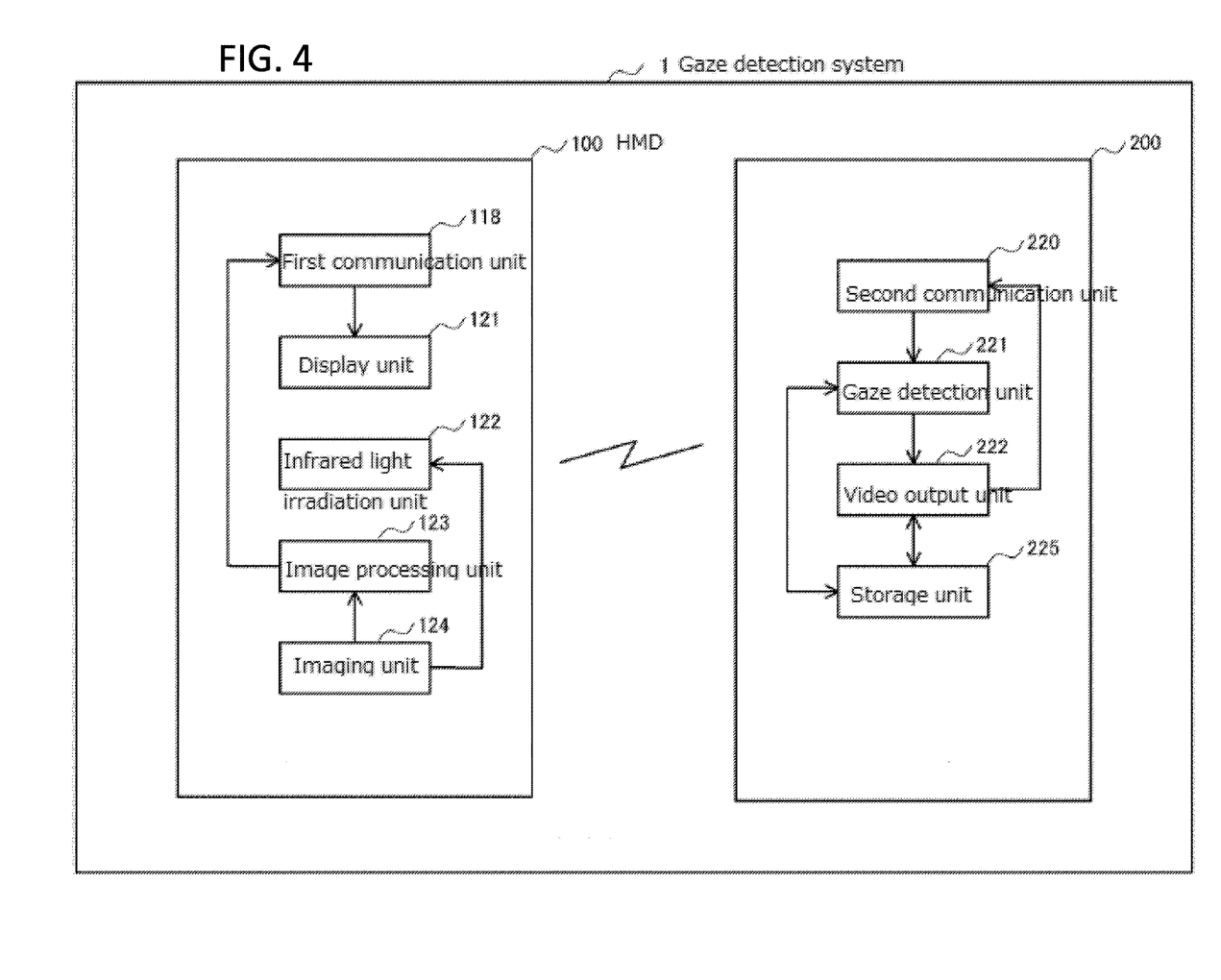
FIG. 4 is a block diagram illustrating a configuration of a head mounted display system according to the embodiment.

FIG. 4 is a block diagram of the head mounted display 100 and the gaze detection device 200 according to the gaze detection system 1. As illustrated in FIG. 4, and as described above, the gaze detection system 1 includes the head mounted display 100 and the gaze detection device 200 which communicate with each other.

As illustrated in FIG. 4, the head mounted display 100 includes the first communication unit 118, the display unit 121, the infrared light irradiation unit 122, the image processing iron 123, and the imaging unit 124.

The first communication unit 118 is a communication interface having a function of communicating with the second communication unit 220 of the gaze detection device 200. As described above, the first communication unit 118 communicates with the second communication unit 220 through wired or wireless communication. Examples of usable communication standards are as described above. The first communication unit 118 transmits image data to be used for gaze detection transferred from the imaging unit 124 or the image processing unit 123 to the second communication unit 220. Further, the first communication unit 118 transfers three-dimensional image data transmitted from the gaze detection device 200 to the display unit 121.

The display unit 121 has a function of displaying the image based on the two-dimensional image data or the three-dimensional image data transferred from the first communication unit 118 on the image display element 108. The three-dimensional image data includes a parallax image for the right eye and a parallax image for the left eye, which form a parallax image pair.

The infrared light irradiation unit 122 controls the infrared light sources 103 and irradiates the right eye or the left eye of the user with infrared light. The infrared light irradiation unit 122 irradiates the eyes with the infrared light according to an opening and closing timing of the global shutter of the camera 116 transferred from the imaging unit 124. That is, the infrared light irradiation unit 122 irradiates the eyes with the infrared light at a timing at which the global shutter of the camera 116 opens and stops the irradiation of the eyes with the infrared light at a timing at which the global shutter of the camera 116 closes.

The image processing unit 123 performs image processing on the image captured by the camera 116 and transfers the processed image to the first communication unit 118, if necessary.

The imaging unit 124 captures an image including the near-infrared light reflected by each eye using the camera 116. The imaging unit 124 transfers the image obtained by imaging to the first communication unit 118 or the image processing unit 123. The imaging unit 124 transfers the opening and closing timing of the global shutter of the camera 116 to the infrared light irradiation unit 122.

The gaze detection device 200 includes a second communication unit 220, a gaze detection unit 221, a video output unit 222, and a storage unit 225, as illustrated in FIG. 4.

The second communication unit 220 is a communication interface having a function of communicating with the first communication unit 118 of the head mounted display 100. As described above, the second communication unit 220 communicates with the first communication unit 118 through wired communication or wireless communication.

The gaze detection unit 221 receives the image data for gaze detection of the right eye of the user from the second communication unit 220, and detects a gaze direction of the user. The gaze detection unit 221 calculates the gaze direction of the user using a procedure to be described below.

The video output unit 222 generates three-dimensional image data that is displayed on the image display element 108 by the display unit 121 of the head mounted display 100, and transfers the three-dimensional image data to the second communication unit 220. Further, the video output unit 222 generates marker image data for use in calibration for gaze detection and transfers the marker image data to the second communication unit 220. The video output unit 222 holds information indicating a coordinate system of the three-dimensional image to be output and three-dimensional position coordinates of the object that is displayed in the coordinate system.

The storage unit 225 is a recording medium that stores various programs or data required for an operation of the gaze detection device 200. Next, detection of the gaze direction according to the embodiment will be described.

Figure 5:
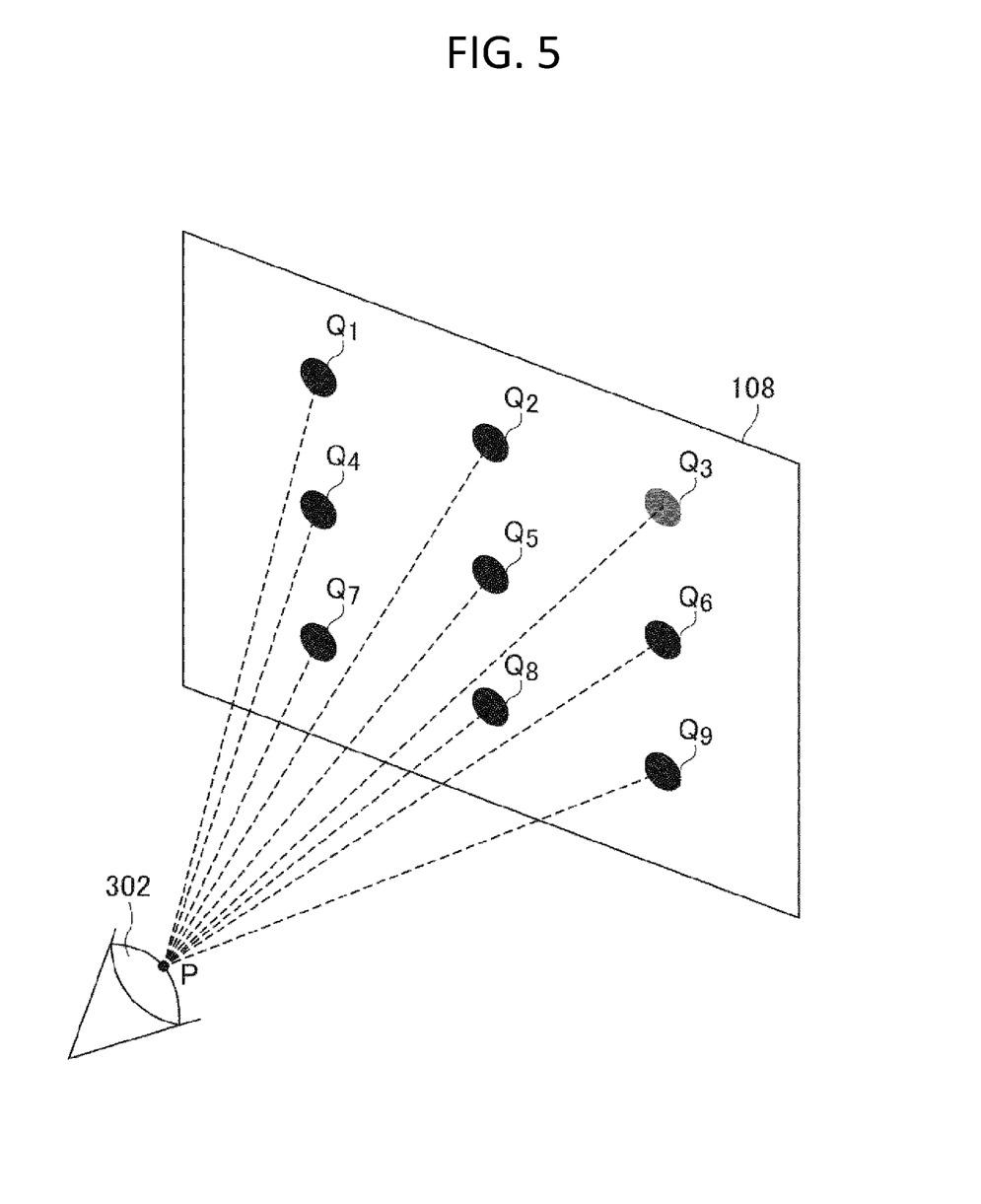
FIG. 5 is a schematic diagram illustrating calibration for detection of a gaze direction according to the embodiment.

FIG. 5 is a schematic diagram illustrating calibration for detection of the gaze direction according to the embodiment. The gaze direction of the user 300 is realized by the gaze detection unit 221 in the gaze detection device 200 analyzing the video captured by the camera 116 and output to the gaze detection device 200 by the first communication unit 118.

The video output unit 222 generates nine points (marker images) including points $Q_1$ to $Q_9$ as illustrated in FIG. 5, and causes the points to be displayed by the image display element 108 of the head mounted display 100. The gaze detection device 200 causes the user 300 to sequentially gaze at the points $Q_1$ up to $Q_9$. In this case, the user 300 is requested to gaze at each of the points by moving his or her eyeballs as much as possible without moving his or her neck. The camera 116 captures images including the cornea 302 of the riser 300 when the user 300 is gazing at the nine points including the points $Q_1$ to $Q_9$.

Figure 6:
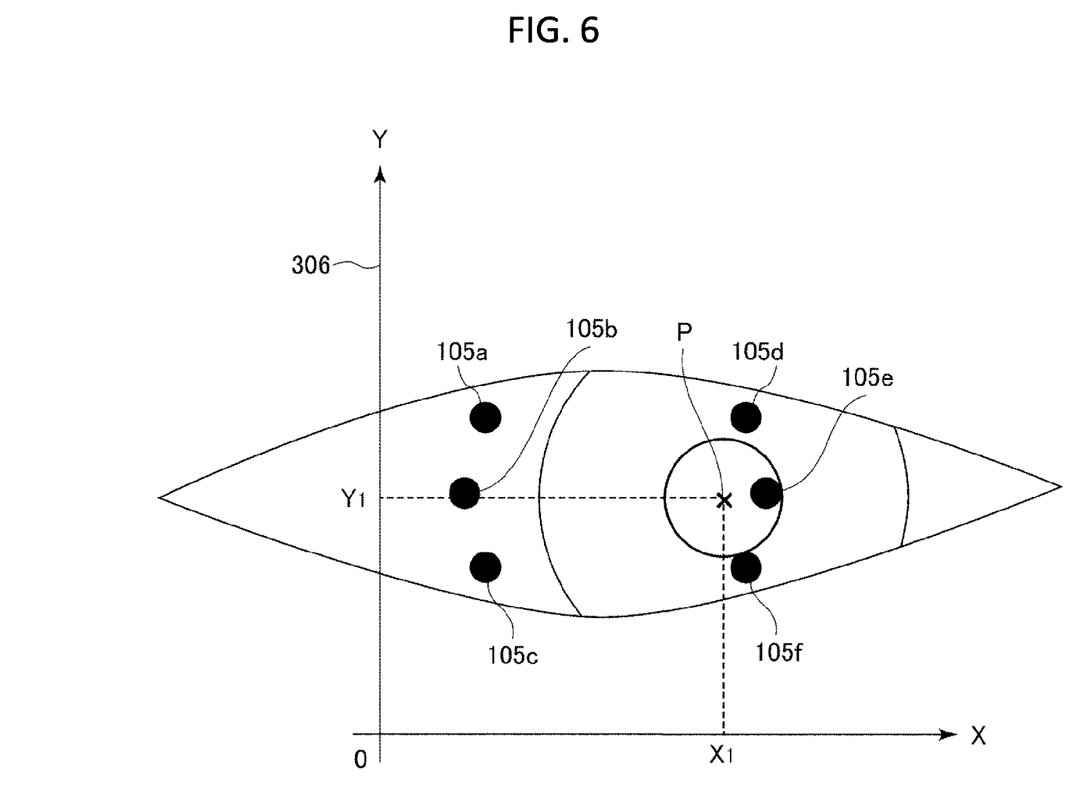
FIG. 6 is a schematic diagram illustrating position coordinates of a cornea of a user.

FIG. 6 is a schematic diagram illustrating the position coordinates of the cornea 302 of the user 300. The gaze detection unit 221 in the gaze detection device 200 analyzes the images captured by the camera 116 and detects bright spots 105 derived from the infrared light. When the user 300 gazes at each point by moving only his or her eyeballs, the positions of the bright spots 105 are considered to be stationary regardless of the point at which the user gazes. Thus, on the basis of the detected bright spots 105, the gaze detection unit 221 sets a two-dimensional coordinate system 306 in the image captured by the camera 116.

Further, the gaze detection unit 221 detects the center P of the cornea 302 of the user 300 by analyzing the image captured by the camera 116. This is realized by using known image processing such as the Hough transform or an edge extraction process. Accordingly, the gaze detection unit 221 can acquire the coordinates of the center P of the cornea 302 of the user 300 in the set two-dimensional coordinate system 306.

In FIG. 5, the coordinates of the points $Q_1$ to $Q_9$ in the two-dimensional coordinate system set for the display screen displayed by the image display element 108 are $Q_1(x1, y1)^T, Q_2(x2, y2)^T, \ldots, Q_9(x9, x9)^T$, respectively. The coordinates are, for example, a number of a pixel located at a center of each point. Further, the center points P of the cornea 302 of the user 300 when the user 300 gazes at the points Q1 to Q9 are labeled $P_1$ to $P_9$. In this case, the coordinates of the points P1 to P9 in the two-dimensional coordinate system 306 are $P_1(X1, Y1)^T, P_2(X2, Y2)^T, \ldots, P_9(Z9, Y9)^T$. T represents a transposition of a vector or a matrix.

A matrix M with a size of 2/2 is defined as Equation (1) below.

$$M = \begin{pmatrix} m_{11} & m_{12} \\ m_{21} & m_{22} \end{pmatrix} \quad (1)$$

In this case, if the matrix M satisfies Equation (2) below, the matrix M becomes a matrix that projects the gaze direction of the user 300 onto an image plane displayed by the image display element 108.

$$PN = MQN (N=1, \ldots, 9) \quad (2)$$

When Equation (2) is written specifically, Equation (3) below is obtained.

$$\begin{pmatrix} x_1 & x_2 & \ldots & x_9 \\ y_1 & y_2 & \ldots & y_9 \end{pmatrix} = \begin{pmatrix} m_{11} & m_{12} \\ m_{21} & m_{22} \end{pmatrix} \begin{pmatrix} X_1 & X_2 & \ldots & X_9 \\ Y_1 & Y_2 & \ldots & Y_9 \end{pmatrix} \quad (3)$$

By transforming Equation (3), Equation (4) below is obtained.

$$\begin{pmatrix} x_1 \\ x_2 \\ \vdots \\ x_9 \\ y_1 \\ y_2 \\ \vdots \\ y_9 \end{pmatrix} = \begin{pmatrix} X_1 & Y_1 & 0 & 0 \\ X_2 & Y_2 & 0 & 0 \\ \vdots & \vdots & \vdots & \vdots \\ X_9 & Y_9 & 0 & 0 \\ 0 & 0 & X_1 & Y_1 \\ 0 & 0 & X_2 & Y_2 \\ \vdots & \vdots & \vdots & \vdots \\ 0 & 0 & X_9 & Y_9 \end{pmatrix} \begin{pmatrix} m_{11} \\ m_{12} \\ m_{21} \\ m_{22} \end{pmatrix} \quad (4)$$

Here, if, $$y = \begin{pmatrix} x_1 \\ x_2 \\ \vdots \\ x_9 \\ y_1 \\ y_2 \\ \vdots \\ y_9 \end{pmatrix}, A = \begin{pmatrix} X_1 & Y_1 & 0 & 0 \\ X_2 & Y_2 & 0 & 0 \\ \vdots & \vdots & \vdots & \vdots \\ X_9 & Y_9 & 0 & 0 \\ 0 & 0 & X_1 & Y_1 \\ 0 & 0 & X_2 & Y_2 \\ \vdots & \vdots & \vdots & \vdots \\ 0 & 0 & X_9 & Y_9 \end{pmatrix}, x = \begin{pmatrix} m_{11} \\ m_{12} \\ m_{21} \\ m_{22} \end{pmatrix}$$

Equation (5) below is obtained.

$$Y = Ax \quad (5)$$

In Equation (5), elements of the vector y are known since these are coordinates of the points $Q_1$ to $Q_9$ that are displayed on the image display element 108 by the gaze detection unit 221. Further, the elements of the matrix A can be acquired since the elements are coordinates of a vertex P of the cornea 302 of the user 300. Thus, the gaze detection unit 221 can acquire the vector y and the matrix A. A vector x that is a vector in which elements of a transformation matrix M are arranged is unknown. Since the vector y and matrix A are known, an issue of estimating matrix M becomes an issue of obtaining the unknown vector x.

Equation (5) becomes the main issue to decide if the number of equations (that is, the number of points Q presented to the user 300 by the gaze detection unit 221 at the time of calibration) is larger than the number of unknown numbers (that is, the number 4 of elements of the vector x). Since the number of equations is nine in the example illustrated in Equation (5), Equation (5) is the main issue to decide.

An error vector between the vector y and the vector Ax is defined as vector e. That is, e=y-Ax. In this case, a vector $x_{opt}$ that is optimal in the sense of minimizing the sum of squares of the elements of the vector e can be obtained from Equation (6) below.

$$x_{opt} = (A^T A)^{-1} A T_y \quad (6)$$

Here, "−1" indicates an inverse matrix.

The gaze detection unit 221 uses the elements of the obtained vector $x_{opt}$ to constitute the matrix M of Equation (1). Accordingly, using the coordinates of the vertex P of the cornea 302 of the user 300 and the matrix M, the gaze detection unit 221 estimates a point at which the eyes of the user 300 are gazing on the video displayed by the image display element 108 within a two-dimensional range using Equation (2).

This gaze direction estimated as described above, for example, can be used for an input position for the displayed object on the image display element 108 or reflected in an expression of an avatar of the user wearing the head mounted display 100 on a network.

<Operation>

Figure 7:
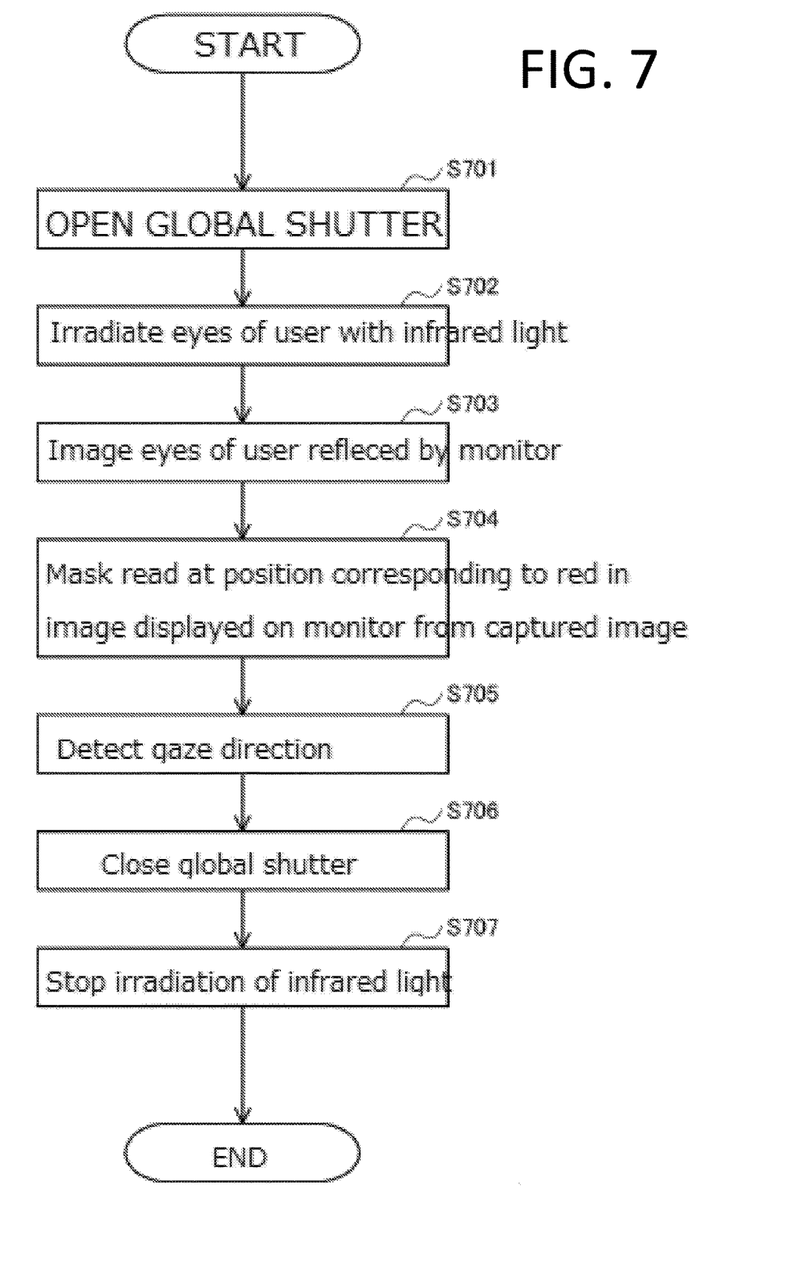
FIG. 7 is a flowchart illustrating an operation of a video system 1 according to an embodiment.

An operation of the gaze detection system 1 according to this embodiment will be described with reference to FIG. 7. FIG. 7 is a flowchart illustrating an operation of the gaze detection system 1 according to this embodiment.

As illustrated in FIG. 7, the imaging unit 124 of the gaze detection system 1 opens the global shutter of the camera 116 (step S701).

When the global shutter of the camera 116 is opened, the infrared light irradiation unit 122 irradiates the eyes of the user 300 with infrared light (step S702).

If the eyes of the user are irradiated with the infrared light, the imaging unit 124 images the infrared light reflected by the cornea of the user 300 and reflected by the image display element 108 that is a monitor is imaged (step S703). The imaging unit 124 transfers an image obtained by imaging to the image processing unit 123 or the first communication unit 118. The first communication unit 118 transmits an image subjected to predetermined image processing by the image processing unit 123 or the image captured by the imaging unit 124 to the gaze detection device 200.

The second communication unit 220 receives the image data transmitted from the head mounted display 100 and transfers the image data to the gaze detection unit 221. The gaze detection unit 221 specifies a pixel position at which red is generated from the pixel data of the image displayed on the image display element 108 in an imaging range of the camera 116 on the basis of the imaging direction of the camera 116, an angle of view of the camera 116, and a positional relationship between the camera 116 and the image display element 108 at a timing at which the image data is captured by the camera 116 from the received image data. That is, a place at which red is generated by the image displayed in the image display element 108 is specified from the received image. Since an image displayed by the image display element 108 is output from the video output unit 222, the gaze detection device 200 can specify the place. The gaze detection unit 221 performs red mask processing on the place specified in the image data (step S704). Thus, it is possible to reduce a likelihood of the gaze detection unit 221 confusing the color red generated by the image display element 108 with a color generated by the near-infrared light.

The gaze detection unit 221 executes a process of detecting a gaze of the user 300 on the basis of the image data after masking, and detects the gaze direction of the user 300 (step S705).

After imaging in step S703, the imaging unit 124 opens the global shutter of the camera 116 (step S706).

When the global shutter is closed, the infrared light irradiation unit 122 stops the irradiation of the infrared light (step S707) and ends the process.

CONCLUSION

Through the above-described process, the head mounted display according to this embodiment can realize a configuration for reflecting invisible light (near-infrared light) while transmitting the visible light, and imaging the infrared light with which the eyes of the user are irradiated without including the hot mirror mounted in the related art. Since the hot mirror is not mounted, the head mounted display can be correspondingly lighter and it is advantageous to reduction in space thereof.

<Supplement>

It is understood that the gaze detection system according to the present invention is not limited to the above embodiments, and may be realized using another scheme for realizing the spirit of the present invention.

Figure 8:
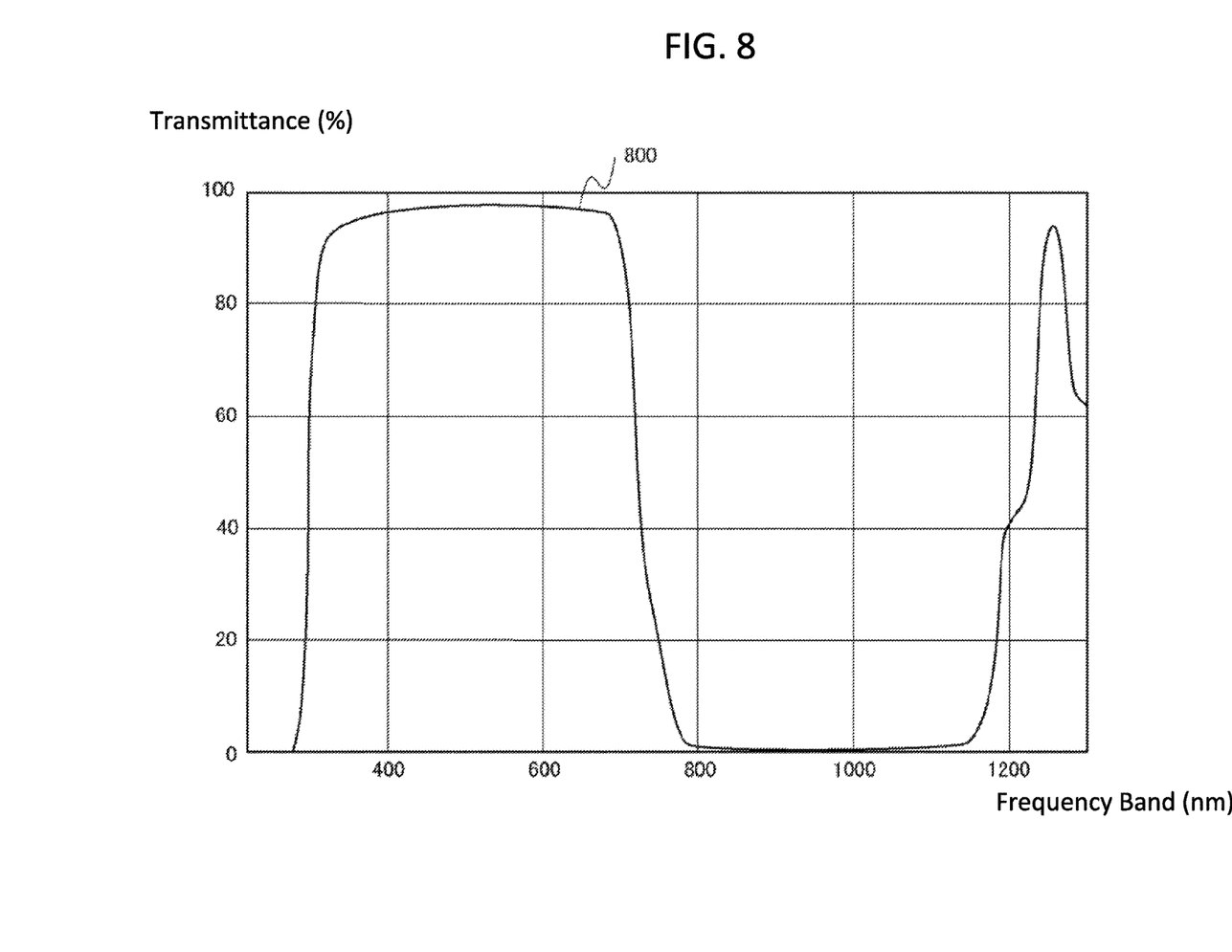
FIG. 8 is a graph schematically illustrating frequency characteristics regarding transmittance of light of a coated surface of an image display element.

In the above embodiments, a configuration in which fine particles of silver are encapsulated in the glass or the transparent resin covering the surface of the image display element 108 to transmit the visible light and reflect the invisible light has been realized, but the present invention is not limited thereto. The configuration may be realized by causing a film that transmits the visible light and reflects the invisible light to adhere to the surface of the image display element 108 on the convex lens 114 side. As a kind of such a film, for example, a so-called thermal barrier film can also be used. An example of such an invisible light reflective film may include a film having optical characteristics as illustrated in FIG. 8. A graph illustrated in FIG. 8 indicates frequency characteristics 800 of the invisible light reflective film in which a horizontal axis indicates a frequency and a vertical axis indicates transmittance, and indicates that light at the frequency is transmitted when the transmittance is higher. Therefore, the invisible light reflective film having the frequency characteristics 800 illustrated in FIG. 8 does not transmit light in an infrared light region (a frequency region of about 700 nm or more and 1200 nm or less) and transmits light in a visible light region (a frequency region of about 300 nm or more and 700 nm or less).

Further, in the above embodiment, imaging is performed through irradiation with infrared light at a timing at which the global shutter is opened, using a camera that performs imaging in a global shutter scheme as the camera 116, but a scheme of defining the infrared light irradiation timing is not limited thereto. For example, when an image is displayed in the image display element 108, the infrared light may be radiated in a so-called blanking period in scanning and the imaging is performed using the camera 116. Performing the imaging using the camera 116 in the blanking period of the image display element 108 means that the camera 116 performs imaging using the invisible light (near-infrared light) only in a darkened time between frames. Thus, since imaging based on the near-infrared light with which the eyes of the user have been irradiated is performed at a timing at which no image is displayed on the image display element 108, it is possible to perform imaging in which interference by red of an LED that emits light when an image is displayed on the image display element 108 is suppressed. Accordingly, since the image of the eyes of the user captured on the basis of the invisible light (near-infrared light) with which the eyes of the user have been irradiated more clearly and the near-infrared light can be obtained, it is possible to further improve accuracy of the gaze detection.

Further, in the above embodiment, a processing order of the process of step S701 and the process of step S702 may be reversed or the processes may be performed simultaneously. Similarly, a processing order of the process of step S706 and the process of step S707 may be reversed or the processes may be performed simultaneously. Further, the process of step S704 and step S705 and the process of step S706 and step S707 may be performed in parallel.

Further, although the processor of the gaze detection device 200 executes the gaze detection program or the like to specify the point at which the user gazes as a gaze detection scheme in the above embodiment, this may be realized by a logical circuit (hardware) including an integrated circuit (an integrated circuit (IC) chip, large scale integration (LSI), or the like) or the like) or a dedicated circuit in the gaze detection device 200. Further, the circuit may be realized by one or a plurality of integrated circuits, or the functions of the plurality of functional units illustrated in the above embodiment may be realized by one integrated circuit. The LSI may be called VLSI, super LSI, ultra LSI, or the like according to an integration difference.

Further, the gaze detection program may be recorded on a processor-readable recording medium, and the recording medium may be a "non-transitory tangible medium" such as a tape, a disk, a card, a semiconductor memory, or a programmable logic circuit. Further, the gaze detection program may be supplied to the processor through an arbitrary transmission medium (such as a communication network or broadcast waves) capable of transmitting the search program. The present invention can also be realized in the form of a data signal embodied in a carrier wave, in which the gaze detection program is implemented by electronic transmission.

For example, the gaze detection program may be installed using, for example, a script language such as ActionScript or JavaScript (registered trademark), an object-oriented programming language such as Objective-C or Java (registered trademark), or a markup language such as HTML5.

EXPLANATION OF REFERENCES

1 Video system
100 Head mounted display
103a Infrared light source
103b Infrared light source
105 Bright spot
108 Image display element
114, 114a, 114b Convex lens
116 Camera (first imaging unit, second imaging unit)
118 First communication unit
121 Display unit
122 Infrared light irradiation unit
123 Image processing unit
124 Imaging unit
130 Image display system
150 Housing
152a, 152b Lens holder
160 Fitting harness
170 Headphone
200 Gaze detection device
220 Second communication unit
221 Gaze detection unit
222 Video output unit
225 Storage unit

What is claimed is:

1. A head mounted display that is mounted on the head of a user and used, the head mounted display comprising:
an irradiation unit that irradiates the eyes of the user with invisible light;
a display that causes a light emitting element that emits light including the invisible light to emit the light and displays an image for the user to view;
an imaging device capable of capturing an image formed by the invisible light; and
an output unit that outputs an image captured by the imaging device as an image for gaze detection,
wherein the display includes a coated surface formed on a surface thereof that transmits the visible light and reflects the invisible light,
the coated surface prevents the invisible light emitted from the display from reaching the imaging device, and
the imaging device images the eyes of the user using the invisible light radiated from the irradiation unit, reflected by the eyes of the user, and reflected by the coated surface.

2. The head mounted display according to claim 1, wherein the coated surface is formed by depositing a metal film or a dielectric film on a transparent plate covering the display surface so that visible light is transmitted and invisible light is reflected.

3. The head mounted display according to claim 1, wherein the coated surface is an invisible light reflective film that transmits visible light and reflects invisible light, the invisible light reflective film adhering to the display surface.

4. The head mounted display according to claim 1, wherein the imaging device is an imaging device that performs imaging in a global shutter scheme, and
the irradiation unit irradiates the eyes of the user with the invisible light when a global shutter is open and does not irradiate the eyes of the user with the invisible light when the global shutter is closed.

5. The head mounted display according to claim 1, wherein the imaging device performs imaging in a blanking period in which scanning for displaying the image on the display is performed.

6. The head mounted display according to claim 1, wherein the invisible light is near-infrared light,
the head mounted display further includes a generation unit that generates an image obtained by filtering red at a position corresponding to a red pixel in the image displayed on the display from the image captured by the imaging device, and
the output unit outputs the image generated by the generation unit.

7. The head mounted display according to claim 1, wherein the display is arranged obliquely toward the imaging device so that an angle between a plane formed by the display and an imaging optical axis of the imaging device is close to 90°.

8. A gaze detection system comprising a head mounted display that is mounted on the head of a user and used, and a gaze detection device that detects a gaze of the user,
wherein the head mounted display includes
an irradiation unit that irradiates the eyes of the user with invisible light;
a display that causes a light emitting element that emits light including the invisible light to emit the light and displays an image for the user to view;
an imaging device capable of capturing an image formed by the invisible light; and
an output unit that outputs an image captured by the imaging device as an image for gaze detection,
the gaze detection device includes a gaze detection unit that detects a gaze direction of the user on the basis of the image output by the output unit,
the display includes a coated surface formed on a surface thereof that transmits the visible light and reflects the invisible light,
the coated surface prevents the invisible light emitted from the display from reaching the imaging device, and
the imaging device images the eyes of the user using the invisible light radiated from the irradiation unit, reflected by the eyes of the user, and reflected by the coated surface.

9. The gaze detection system according to claim 8, wherein the coated surface is formed by depositing a metal film or a dielectric film on a transparent plate covering the display surface so that visible light is transmitted and invisible light is reflected.

10. The gaze detection system according to claim 8, wherein the coated surface is an invisible light reflective film that transmits visible light and reflects invisible light, the invisible light reflective film adhering to the display surface.

11. The gaze detection system according to claim 8, wherein the imaging device is an imaging device that performs imaging in a global shutter scheme, and
the irradiation unit irradiates the eyes of the user with the invisible light when a global shutter is open and does not irradiate the eyes of the user with the invisible light when the global shutter is closed.

12. The gaze detection system according to claim 8,
wherein the imaging device performs imaging in a blanking period in which scanning for displaying the image on the display is performed.

13. The gaze detection system according to claim 8,
wherein the invisible light is near-infrared light, and
the gaze detection unit executes gaze detection on the basis of an image that is generated by performing filtering for suppressing chroma of red at a position corresponding to a red-based pixel in the image displayed on the display, on the image output from the output unit.

14. The gaze detection system according to claim 8,
wherein the display is arranged obliquely toward the imaging device so that an angle between a plane formed by the display and an imaging optical axis of the imaging device is close to 90°.

* * * * *